No. 780,253. PATENTED JAN. 17, 1905.
C. YORE.
BREAD OR ROLL MAKING MOLD.
APPLICATION FILED MAY 2, 1904.
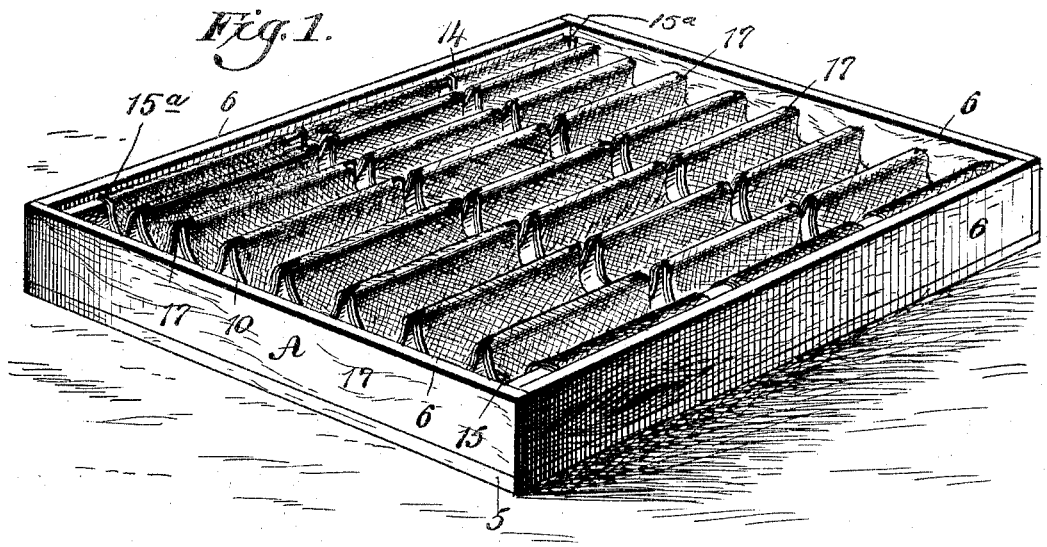
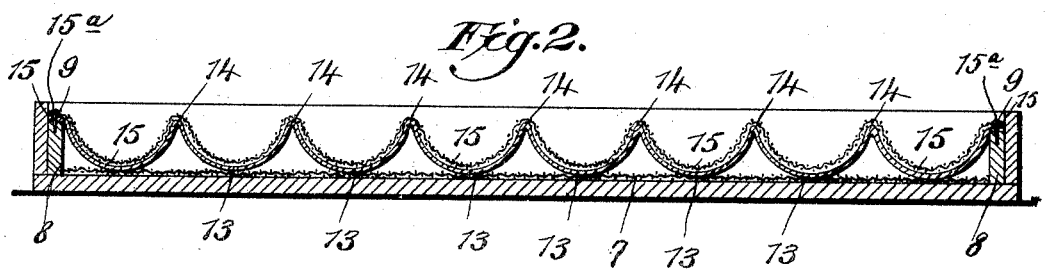
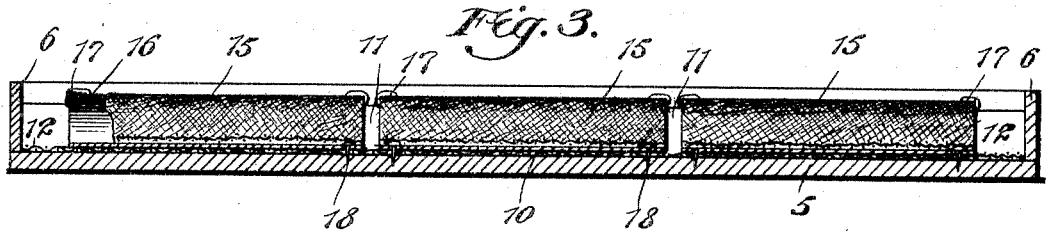
Witnesses
James F. Duhamel
V. E. Nichols
Inventor
Christin Yore
By his Attorneys
Griffin, Bernhard & Cavanagh No. 780,253. Patented January 17, 1905.

UNITED STATES PATENT OFFICE.

CHRISTIN YCRE, OF NEW YORK, N. Y.

BREAD OR ROLL MAKING MOLD.

SPECIFICATION forming part of Letters Patent No. 780,253, dated January 17, 1905.

Application filed May 2, 1904. Serial No. 206,049.

*To all whom it may concern:*

Be it known that I, CHRISTIN YCRE, a citizen of the Republic of France, residing in the city of New York, borough of Manhattan, county of New York, and State of New York, have invented certain new and useful Improvements in Bread or Roll Making Molds, of which the following is a specification.

The present invention appertains to an improved mold for making bread, and has particular application to an article of the type described adapted especially for use in molding Marseillais rolls.

In carrying out the present invention I have in contemplation the provision of an improved mold in which a large batch of bread or rolls can be shaped and prepared for baking, the construction and the arrangement of the parts of my improvement being such that the dough will not stick to the parts or body of the mold and the rolls or loaves to be made may be easily and quickly cut to a proper size. In molds of this type as heretofore constructed and with which I am acquainted it has been customary to secure to the body of the box a number of blocks or ribs rounded at their upper ends, said ribs being arranged in rows and covered with an apron; but in actual experience such an improvement has proven to be clumsy and inconvenient for general use, as it is difficult to give the rolls the proper shape so that they may be immediately transferred to the oven for baking, while the mold as a whole is heavy and the rolls formed thereby are ill-shapen.

It is therefore a further object to overcome the above difficulties by forming each row of ribs or loaf-molds of a single piece of material and covering each of said rows with a suitable apron, the ends of the material from which the row of grooves or molds are made being secured to the end of the box with the apron.

A further object of my invention is to provide a mold which will embody the essential and desired features of simplicity, durability, and lightness, the arrangement of the roll-forming grooves being such that a loaf or roll of neat and regular appearance will be formed.

With the above-recited object and others of a similar nature in view my invention consists in the construction and arrangement of the parts, as described in this specification, delineated in the accompanying drawings, and set forth in the appended claims.

In the accompanying drawings similar characters of reference indicate like parts in all the views.

Figure 1 is a perspective view of a mold embodying my improvements. Fig. 2 is a vertical transverse section taken through a mold such as is shown in Fig. 1, and Fig. 3 is a vertical longitudinal section of the same.

In the drawings annexed hereto the letter A indicates the mold-box as a whole, such box being formed of any suitable material, such as wood, and comprises the bottom or base board 5 and the side members 6, extending upward to any desired height. The upper surface of the bottom is covered with a carpet or apron 7 of a suitable fabric, such as canvas or the like, which is employed for the purpose of preventing a batch of dough from sticking to the bottom and sides of the mold-box.

Secured at opposite sides of the box 7 are the end strips 8, to which are attached the contiguous ends 9 of the corrugated roll-forming plates or strips 10. In the present instance I have shown three strips or plates employed in a mold, said plates being arranged in longitudinal parallel rows with a gutter or space 11 formed between each row, a space, as at 12, being also left between the outer edges of the end rows and the side walls of the mold-box. It is upon the construction of the corrugated plate or roll-forming strip that I wish to lay particular emphasis, as the grooves and ribs formed by the corrugations give to the rolls the desired shape. These strips or plates are formed of any suitable material, preferably metal, such as sheet-tin or the like, and the corrugations or grooves are formed in approximately the shape of a semicircle, as is shown at 13, while the beads or ribs at the point of juncture of each groove with the next one come to approximately a sharp angle, as shown at 14. A strip of canvas or like fabric is employed to cover each corrugated strip or plate, as is shown at 15, the apron conforming to the shape and contour of the corrugations of the strip, and pins or tacks 15ª passing through the apron and the ends of the corrugated strip secure these parts to the bars or cleats 8 at the ends of the box. The angular-beaded portions 14 of each strip are provided with apertures or thread-openings 16, through which a strip or thread 17 may pass, such thread also passing through the canvas fabric and securing the latter against displacement. Tacks or pins, as at 18, are also used to secure the plate or strip to the bottom of the box, the construction of the parts being such that a strong durable, yet light, mold will be formed if made in accordance with my improvements.

From the above description, taken in connection with the accompanying drawings, the construction and manner of employing my improved mold will be readily apparent. The batch of dough is prepared and then placed in the mold so as to occupy the semicircular grooves or depressions of the strips or plates. A knife may then be drawn across the dough and in the space between the ribs and down the spaces 12 at the ends of the box, so that to all intents and purposes the batch of material is separated into a number of loaves. When this operation has been completed and the rolls have assumed the size required, the mold may be inverted upon a peel and may then be taken to the oven for the purposes of baking. It has been found by actual experience that a mold constructed as here described possesses many advantages over the molds now in use. By making each roll-forming strip with its depressions of a single corrugated piece of material the desired shape of the loaf or roll may be precisely and accurately obtained and the sticking of the mass of dough between the beads or ribs and the under side of the apron covering the same is obviated, so that when the mold is reversed upon the peel the batch of rolls will drop easily and readily therefrom. The dough-receiving grooves formed in the corrugated strips are approximately semicircular in form, so that a neat attractive roll may be molded therein, and the corrugated plates or strips are easily and readily attached in position or removed therefrom, as desired, the consequence being that a light, cheap, and convenient mold is obtained and one which is especially adapted for use in making Marseillais rolls. The provision of the canvas apron also prevents the odor of the wood of the body of the mold permeating and affecting the batch of dough.

Having thus described my invention, what I claim, and desire to secure by Letters Patent of the United States, is—

1. A mold of the character described, comprising a box, a corrugated plate or strip in said box and having its end portions rigidly secured at the sides of the box, a covering for the bottom of the box, and an apron passing over the beads of the corrugated strips and into the grooves thereof, said apron being secured to the corrugated plate or strip.

2. A mold of the character described, comprising a box, a plurality of corrugated strips or plates extending entirely across said box and arranged in parallelism, spaces being left between the adjacent edges of the strips and between the outer edges of the outside strips and the sides of the box, and an apron covering each strip and conforming to the shape or contour thereof.

3. A mold of the character described, comprising a box, a corrugated roll-forming plate or strip for said box, the grooves formed by the corrugations of the plate or strip being approximately semicircular in contour while the beads of the corrugations are approximately angular, and an apron covering said strip or plate and conforming to the shape thereof.

4. A mold of the character described, comprising a box, a plurality of metallic corrugated strips or plates extending across said box and arranged in parallelism therein, in such manner that spaces are left between the adjacent ends of opposite strips and between the outer longitudinal edges of each strip or plate and the adjacent wall of the box, and a covering for each strip or plate arranged to conform to the contour of the upper surface of the plate which it covers.

5. A mold of the character described, comprising a box, having cleats or strips at opposite ends thereof, a fabric covering the floor of the box, a plurality of metallic corrugated roll-forming strips or plates arranged in said box, spaces being left between certain of said strips for the passage of a knife, an apron covering each of said strips and conforming to the contour thereof, means for securing the apron and the corrugated strips or plates to the cleats at the ends of the box, and stitching securing the apron to the beaded portions of the corrugated strips or plates.

In testimony whereof I have hereunto signed my name to this specification in the presence of two witnesses.

CHRISTIN YCRE.

Witnesses:
R. B. CAVANAGH,
JAS. H. GRIFFIN.